R. W. SMITH & W. P. THOMSON.
INSULATED RAIL JOINT.
APPLICATION FILED AUG. 4, 1914.

1,126,112.

Patented Jan. 26, 1915.

Witnesses

Inventors
REUBEN W. SMITH
WILLIAM P. THOMSON
By
Attorney

R. W. SMITH & W. P. THOMSON.
INSULATED RAIL JOINT.
APPLICATION FILED AUG. 4, 1914.

1,126,112.

Patented Jan. 26, 1915.

Witnesses

Inventors
REUBEN W. SMITH
WILLIAM P. THOMSON
Attorney

R. W. SMITH & W. P. THOMSON.
INSULATED RAIL JOINT.
APPLICATION FILED AUG. 4, 1914.

1,126,112.

Patented Jan. 26, 1915.
6 SHEETS—SHEET 6.

Witnesses

Inventors
REUBEN W. SMITH
WILLIAM P. THOMSON

Attorney

UNITED STATES PATENT OFFICE.

REUBEN W. SMITH, OF WEST COLLINGSWOOD, NEW JERSEY, AND WILLIAM P. THOMSON, OF NEW YORK, N. Y., ASSIGNORS TO THE RAIL JOINT COMPANY, OF NEW YORK, N. Y., A CORPORATION OF NEW YORK.

INSULATED RAIL-JOINT.

1,126,112.     Specification of Letters Patent.     Patented Jan. 26, 1915.

Application filed August 4, 1914. Serial No. 855,043.

*To all whom it may concern:*

Be it known that we, REUBEN W. SMITH and WILLIAM P. THOMSON, citizens of the United States, residing, respectively, at West Collingswood, in the county of Camden, State of New Jersey, and New York, county of New York, State of New York, have invented certain new and useful Improvements in Insulated Rail-Joints, of which the following is a specification.

This invention relates to the art of insulated rail joints, and more particularly to those having the structural and functional characteristics of the well-known Weber type of insulated rail joint.

Accordingly, it is the general purpose and object of the present invention to provide certain novel and practical features of improvement which possess special utility in their application to an insulated rail joint of the type wherein the rail ends are supported by a steel shoe angle having a rail-supporting base plate, and an upright member at its outer edge which constitutes a bolting plate for the outside of the joint, in combination with wooden or equivalent filler members arranged at both sides of the rails.

To this end, a distinctive object of the invention is to provide an improved construction and arrangement of parts, so related to the shoe angle and the other members of the joint, as to provide thoroughly practical and effectual means whereby the joint parts may be more firmly secured together and to the rails, thus providing a stiffer and stronger joint structure giving substantial support to the rail ends under load. In this connection, the invention has specially in view a construction which positively and reliably assists in holding the rail-supporting base plate against the bases of the rails, not only at the outside of the joint but also at the inside of the joint, so that the rail ends under traffic may be prevented from responding to the tendency of moving upwardly and independently, to any appreciable extent, of the base plate. In other words, the present invention proposes a construction affording a direct and rigid supporting connection between the inner free edge portion of the base plate of the shoe and a reinforcing angle, thereby securing a maximum rail-supporting effect for the base plate and preventing straining and weakening of the various parts of the joint, and the cutting and mashing out of the base insulating plate which ordinarily results from failure to maintain a uniform broad bearing against all of the under face of the rail base.

Another important object of the present invention is to provide what may be termed a closed-in insulated rail joint, that is to say, a joint wherein the insulation within the joint is effectively covered and inclosed in such a manner that dirt, cinders, water, and other destructive foreign substances are effectually excluded from the interior of the joint and prevented from penetrating between the surfaces above and below the base insulating plate, and thereby creating a disintegrating and destructive effect upon the insulation on account of the chafing and pounding movements of the rail ends thereupon.

A further object of the invention is to provide simple and positive means for locking the insulation of the joint to overcome any tendency of the base insulating plate to creep or work out of place longitudinally and laterally under traffic, and in connection with the insulating feature of the joint the invention also contemplates a construction whereby the insulating parts may be readily removed and replaced without dismantling the joint.

A further object of the invention is to provide a simple and practical means for utilizing a single reinforcing member in joints for use with several sizes and heights of rails.

With these and other objects in view which will be apparent to those familiar with this art, the invention consists in the novel construction, combination, and arrangement of parts hereinafter more fully described, illustrated, and claimed.

Though susceptible of modification in a variety of forms and structures without departing from the purport and intent of the invention, a few of the preferred and practical embodiments of the latter are shown in the accompanying drawings, in which—

Fig. 11 is an end view of a rail joint presenting another modification of the invention wherein the use of a separate holding shim may be dispensed with. Fig. 12 is a plan view of the form of construction shown in Fig. 11, the view omitting such parts as will better show the interlocking of the insulating plate.

Like reference characters designate corresponding parts in the several figures of the drawings.

Since the invention is primarily designed to be embodied in an insulated rail joint of the Weber type, there is shown in the drawings a joint of this character which includes in its general organization, in combination with the rails R, a steel shoe angle, designated generally by the reference numeral 1. This shoe angle is formed with a rail-supporting base plate 2 extending beneath the rail bases and whose inner edge portion projects beyond the rail flanges at the inside of the joint. In connection with the rail-supporting base plate, the shoe angle is provided at the outer edge portion of said plate with an upright member 3 constituting the outside girder holding plate of the joint and receiving the usual joint bolts 4 which extend through the rail webs and the wooden or equivalent filler members 5 and 6 arranged respectively upon opposite sides of the rails. To this extent, the illustration responds to the fundamental features of a Weber type of rail joint, and in combination therewith the present invention utilizes at the inside of the joint an angular clamping member, designated in its entirety by the reference number 7, and consisting of an angle plate having a horizontal foot flange 8, and an upright bolting flange 9, which latter flange bears against the outer side of the inner filler member 6 and constitutes the inside girder bolting angle which receives the joint bolts 4, and sustains the inner edge portion of the base plate 2. The foot flange 8 of the said inside girder bolting angle 7 receives one or more clamping bolts, but in the form of the invention shown in Figs. 1 and 2 of the drawings, a single clamping bolt 9ª is employed which not only extends through the said flange 8 of the girder bolting angle, but also through the projecting inner edge portion of the rail-supporting base plate 2. This provides a rigid connection between the said base plate and the girder bolting angle 7, which latter in turn is rigidly clamped in place against the inside filler member 6 by the joint bolts. Hence, the assembled joint parts are thereby firmly secured together and to the rails, and provide a stiff and strong joint structure which firmly and effectually supplements and reinforces the base plate and consequently affords a stable support for the rail ends under load. In the form of the invention illustrated in Figs. 1 and 2 of the drawings, the clamping bolt 9ª is shown as of the button head type with an oval neck portion 10 to prevent turning thereof in the bolt hole of the base plate, while the nut 11 at the upper end of the bolt is preferably prevented from turning loose by means of a suitable nut lock 12, the form of nut lock illustrated being essentially in the form of a washer held beneath the nut 11 and having a bent-up locking lip 13 lying at one side of the tightened nut. Also, in this form of the invention, the clamping bolt 9ª is preferably placed near the longitudinal center of the joint so as to occupy a position between the ties, but if desired, it is obvious that a plurality of these bolts may be utilized at other locations throughout the length of the joint.

Figure 1:
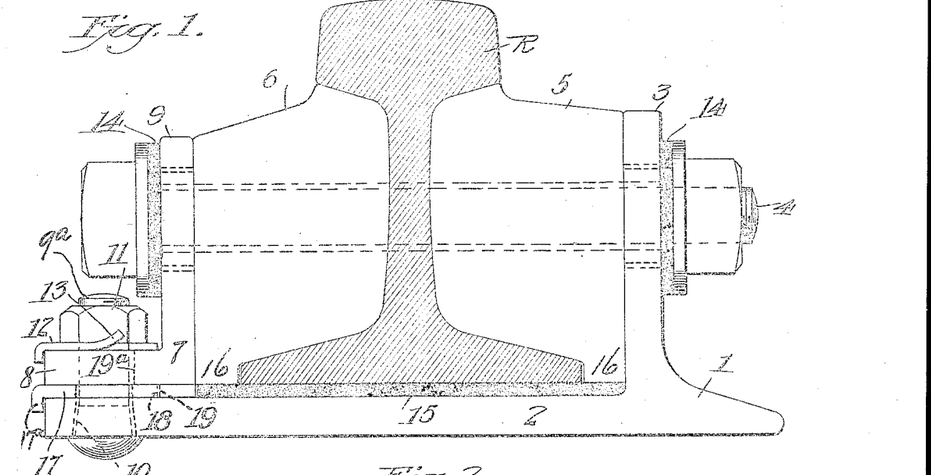
Figure 1 is an end view of an insulated rail joint of the general Weber type embodying improvements contemplated by the present invention.
Figure 2:
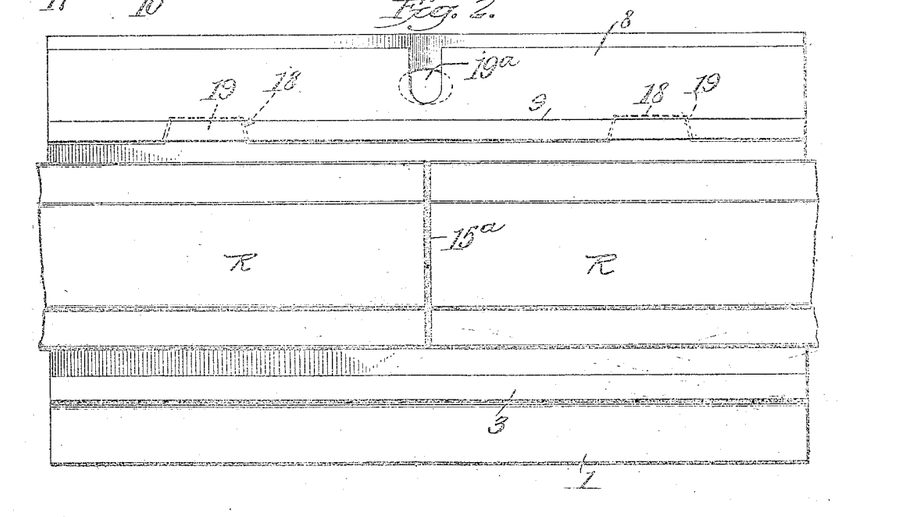
Fig. 2 is a top plan view of the form of joint illustrated in Fig. 1, but omitting such members as will more clearly expose the locking connection between the base plate and the reinforcing angle, and also between the base insulating plate and the metal holding shim.

In an insulated rail joint of the type shown in Figs. 1 and 2 of the drawings, the insulating means therefor include the opposite wooden or equivalent filler members 5 and 6, the usual insulating end post 15$^a$, conventional or other suitable bolt insulation 14 for the head and nut portions of the joint bolts, and also an insulating plate 15 for the bases of the rails, said insulating plate being interposed between the rail bases and the upper side of the rail-supporting base plate 2 of the shoe angle. This base insulating plate extends the full width of the rail bases and, as shown, projects beyond the edges of the rail flanges in order to provide complete and effectual base insulation for the joint. In this connection, a detail of construction which is of practical importance is the feature of forming the wooden or equivalent filler members 5 and 6 at the lower outer corners thereof with shielding lips 16, which overhang the edges of the rail flanges and extend down to the projecting edge portions of the insulating plate 15, so as to more effectually protect and cover the latter and provide an insulated rail joint which is strictly of the closed-in type in the sense that the insulating base plate is wholly and entirely covered, with the result of excluding dirt, cinders, water, and other destructive foreign substances therefrom.

It has been found desirable to provide means for positively overcoming any tendency of the insulating base plate 15 to creep or work out of place longitudinally and laterally under traffic. In order to accomplish this desirable result, a suitable locking means is provided for the said base insulating plate. These locking means may be variously arranged, and are susceptible of considerable modification without departing from the essential thought of the invention with respect thereto, but referring first to that form of the locking means illustrated in Figs. 1 and 2 of the drawings, it will be observed that the same include what may be termed a holding shim 17 consisting of a metal plate clamped firmly in position between the inner edge portion of the rail supporting base plate 2 and the under side of the foot flange 8 of the bolting angle 7. This holding shim may be provided at its outer edge with a bent-down retaining flange 17$^x$ which overlaps the inner edge of the base plate 2 to prevent the shim from displacement when only one bolt is used. The shim is provided at its inner edge with one or more reëntrant keeper mortises or recesses 18 which receive and interlock with projecting locking tenons 19 formed at one edge portion of the base insulating plate 15.

The holding shim 17, as shown, is of substantially the same thickness as the base insulating plate 15 and is provided with a large clearance hole 19$^a$ receiving the clamping bolt 9$^a$ so that the same may be readily adjusted longitudinally in conjunction with the base insulating plate 15.

The construction above described and illustrated in Figs. 1 and 2 of the drawings exemplifies the essential features of the invention. It will be observed that the same provides an effectual means whereby the various parts of the joint are firmly and securely clamped together and to the rail ends. Furthermore, as already pointed out, the improved structure described effectively covers and incloses the base insulation of the joint so that the entrance of destructive foreign substances is prevented. Also, the worn out piece of base insulation can be readily removed and replaced by simply loosening the joint parts and removing the holding shim and its clamping bolt, leaving all other parts in place to thereby afford safety to the track; whereas in usual types of joints, it is ordinarily necessary to dismantle the entire joint to remove and replace insulation, thus rendering the track temporarily unsafe for traffic.

Figure 3:
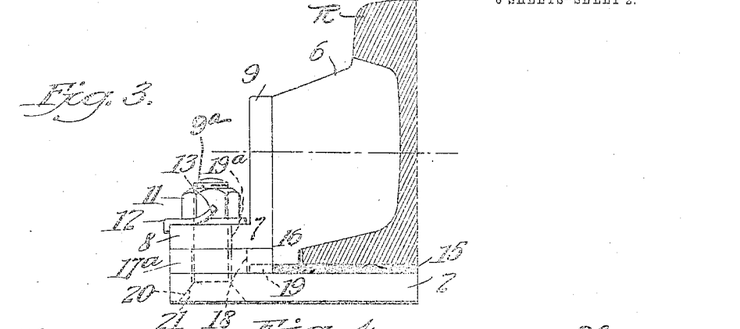
Fig. 3 is a longitudinally bisected end view of a modification that may be resorted to with respect to certain features of the joint.
Figure 4:
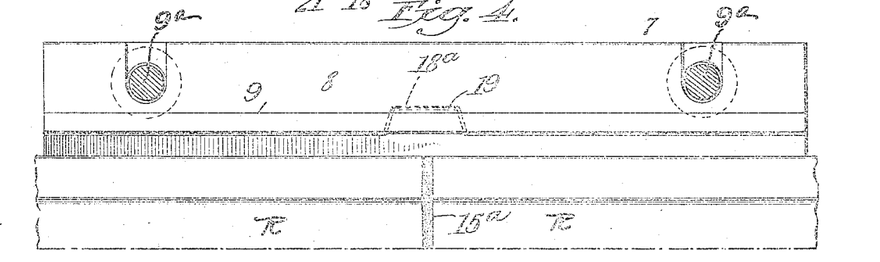
Fig. 4 is a longitudinally bisected plan view of the form of construction shown in Fig. 3, illustrating the clamping bolts in section, and omitting such members as will more clearly expose the locking connection between the base insulating plate and the metal holding shim.

As already noted, various modifications of the different features of the invention may be employed and still effectually perform the intended functions thereof. For instance, as illustrated in Figs. 3 and 4 of the drawings, there is shown a construction especially available where the reinforcing girder bolting angle is to be employed with a higher rail and shoe angle than in the form of joint shown in Fig. 1 of the drawings. That is to say, according to the modification illustrated in Figs. 3 and 4 of the drawings, it will be understood that the upright shoe angle and the rail are higher than in the joint illustrated in Fig. 1, but the girder bolting angle 7 remains the same height. Accordingly, this situation necessitates the use of a thicker shim than that shown in Fig. 1 of the drawings, the thicker shim being designated by the reference number 17$^a$ in Fig. 3 of the drawings. In connection with this modification, it will be readily understood that different heights of rails and shoe angles require different thicknesses of shims, and by using the described construction, a large number of bolting angles may be made up and kept in stock preparatory to use with joints for rails and shoe angles of varying heights.

According to the modification shown in Figs. 3 and 4 of the drawings, the locking of the base insulating plate 15 may be effected by means of a single locking tenon 19 located at or near the center of the joint and interlocking with a single reëntrant mortise or recess 18 formed in the inner edge of the shim 17ᵃ. (See Fig. 3.) Also, the modifications of Figs. 3 and 4 suggest the expedient of employing a plurality of clamping bolts 9ᵃ having beveled head portions 20, lying within countersunk seats 21 formed in the underside of the rail supporting base plate 2, thereby disposing the heads of the bolts 9ᵃ entirely out of the way so that the same may be located directly over the ties without interfering with the latter and without the necessity of recessing or gouging the ties to acommodate the bolt heads.

Figure 5:
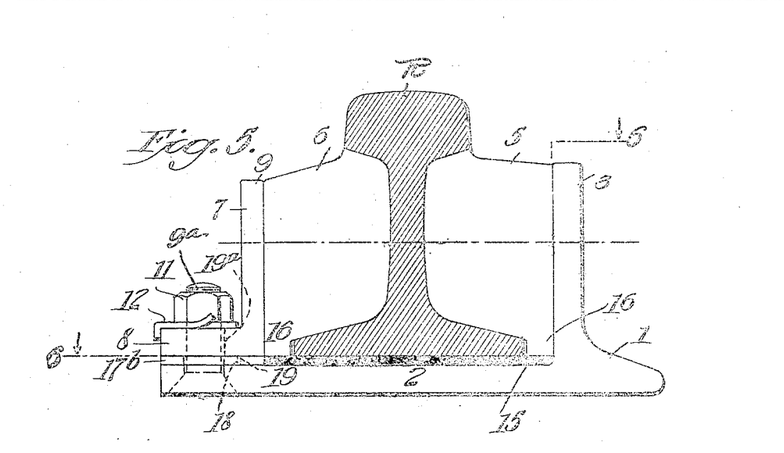
Fig. 5 is an end view of a rail joint illustrating a still further modification of the invention, showing the improvements applied and arranged to provide a one-end insulated joint, and wherein the holding shim is laterally extended at one end to provide a riser or rail-bearing plate beneath the receiving rail of the joint.
Figure 6:
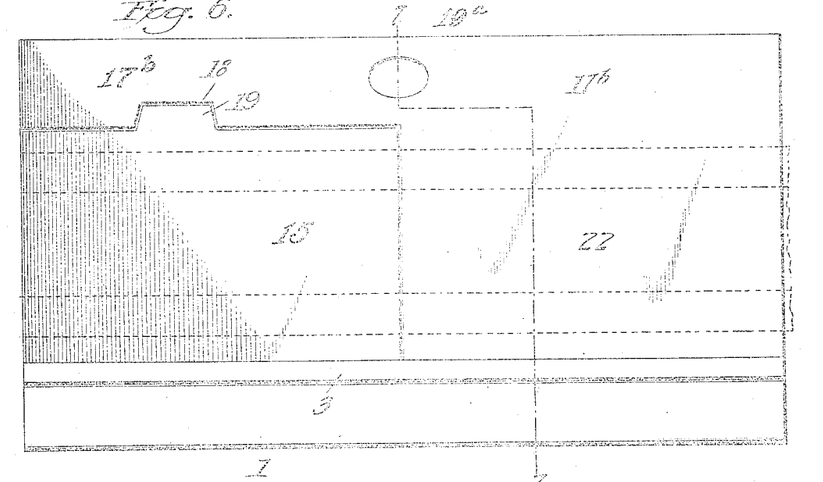
Fig. 6 is a sectional plan view of the form of rail joint illustrated in Fig. 5, substantially on the line 6—6 of Fig. 5, omitting from the illustration the angular clamping member and such other parts as will better expose the base-arrangement of the combined rail-seating riser-plate and shim, and the base insulating plate which interlocks with the shim.
Figure 7:
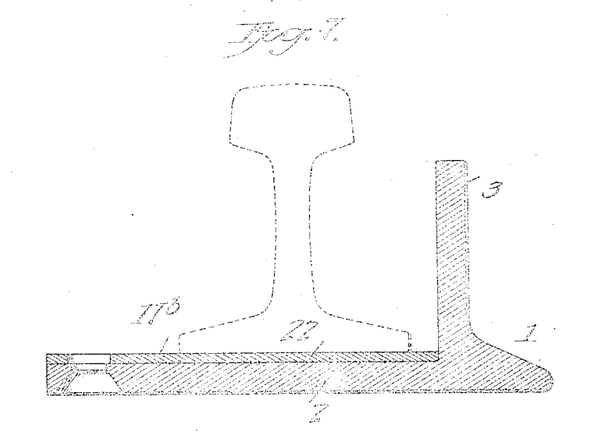
Fig. 7 is a cross-sectional view of the one-end insulated form of rail joint on the line 7—7 of Fig. 6, the view omitting the same parts of the joint that are omitted in Fig. 6.

While a distinctive feature of the present invention resides in the rigid clamping connection between the inner edge portion of the rail supporting base plate and the girder bolting angle, and the locking means for securing the base insulation against creeping or displacement in any direction, the several details of construction involved therein are susceptible of quite a wide range of modification, some of which modifications are of practical importance by reason of contributing added features and functions to the joint. This is very well exemplified by the modfication shown in Figs. 5, 6 and 7 of the drawings wherein the metal holding shim, designated by the reference number 17ᵇ not only performs the functions of a solid metal blocking between the girder bolting angle 7 and the base plate 2 and as a holding means for locking the base insulation in place, but also is utilized in combination with the base insulating plate to form a one-end insulated rail joint. As shown this is accomplished by having the metal shim 17ᵇ in strip or bar form for substantially one-half of the length of the joint, while for the other half of the joint, the shim is extended laterally to provide a wide rail-seating riser-plate 22 underlying the receiving rail of the joint, and thereby acting as a compensating metal filler of the same thickness as the base insulating plate 15 within the insulated end of the joint under the leaving rail. In this modification of the invention, the strip or bar portion of the shim 17ᵇ is formed with a keeper mortise 18 for the locking tenon 19 on the insulating plate, as and for the purpose already described, and likewise in this modification one or more coupling bolts are utilized for rigidly clamping the girder bolting angle and metal shim to the inner edge portion of the base plate.

Figure 8:
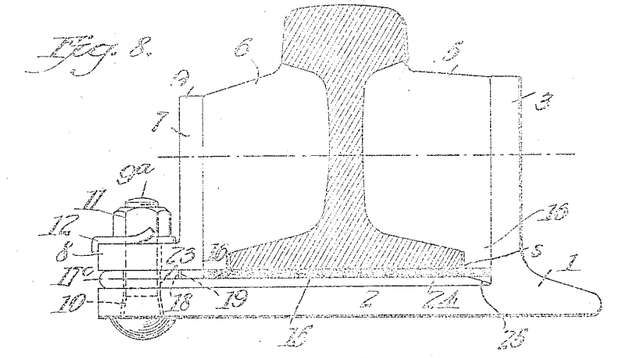
Figs. 8, 9, and 10 are similar end views of a rail joint including modified forms of the holding shim, in combination with supporting plates or shims coöperating with the base insulating plate beneath the rail base.

Still referring to the range of modification that may be resorted to in the construction and use of the metal holding shim, reference is made to the construction and arrangement of parts shown in Fig. 8 of the drawings, wherein the metal holding shim, designated by the reference number 17ᶜ has one edge portion thereof folded upon itself, as at 23, to form a substantially solid metal blocking between the girder bolting angle 7 and the base plate, the folded edge portion having formed therein a keeper mortise 18 for receiving the locking tenon 19 of the base insulating plate, thereby carrying out the function of locking the base insulation in place in substantially the manner already described. But, in addition to the folded edge portion 23, the modified metal holding shim 17ᶜ is laterally widened to provide a supporting plate extension 24 which lies between the upper side of the base plate 2 and the under side of the base insulating plate 15. At its edge opposite the folded edge portion 23, the said modified holding shim 17ᶜ is provided with a guiding bevel 25 to facilitate the insertion of the shim into the joint beneath the base insulating plate.

In further explanation of the functional characteristics of the modified form of construction shown in Fig. 8 of the drawings, it will be understood by those familiar with rail joints of this character that after the base insulating plate has been subjected to heavy loads, it is liable to become compressed under the rail base, leaving a raised shoulder at the point indicated by the letter S. This shoulder renders the withdrawal of the insulation rather difficult without disturbing the rails or the shoe angle, but in the construction referred to and illustrated in Fig. 8 by first entirely removing the shim 17ᶜ this difficulty is avoided, since ample room will then be allowed for the insulating plate to drop down and permit the shoulder to clear the rail base. When placing an insulating plate in position at the time of initially assembling the joint, or when renewals are made, the guiding bevel 25 at one edge of the shim facilitates the latter being easily forced under the insulating plate 15 without damaging the latter.

Figure 9:
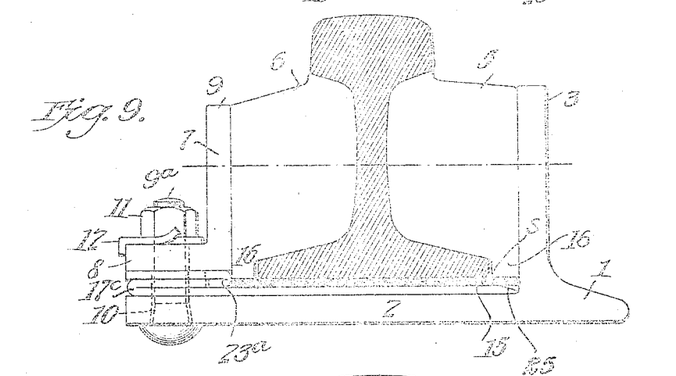

A structural variation of the modification illustrated in Fig. 8 is shown in Fig. 9 of the drawings, and consists in providing a modified shim 17ᵉ having a double folded edge portion 23ᵃ which constitutes the solid metal blocking between the girder bolting angle 7 and the rail-supporting base plate, said double folded edge portion forming an alternative means for raising the girder bolting angle 7 for a higher rail as exemplified in the shim 17 of Fig. 3. However, in other respects the structural and functional features of the form of construction shown in Fig. 9 are the same as prevail in the modification shown in Fig. 8 of the drawings.

Figure 10:
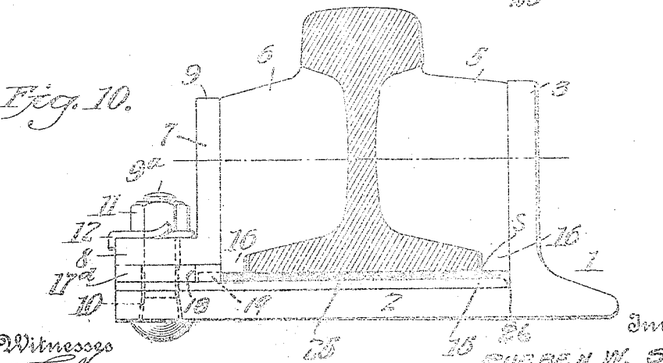

With further reference to the modifications in the form and use of the metal holding shim, a form of construction is illustrated in Fig. 10 of the drawings wherein a separate metal supporting shim 25 is arranged beneath the base insulating plate 15 and is coextensive in width with the rail supporting base plate 2. This supporting shim 25 is associated with a separate metal holding shim 17ᵈ placed between the girder bolting angle 7 and the edge portion of the shim 25 which overlies the inner edge portion of the base plate 2, and is provided with the keeper mortise 18 receiving the locking tenon 19 of the insulating plate. Also, in this modified construction, the inside edge of the supporting shim, within the joint, is provided with an upturned retaining shoulder 26 overlapping an edge of the insulating plate 15, thereby forming a means for forcibly withdrawing the insulating base plate 15 through the medium of the shim 25.

Figures 11, 12:
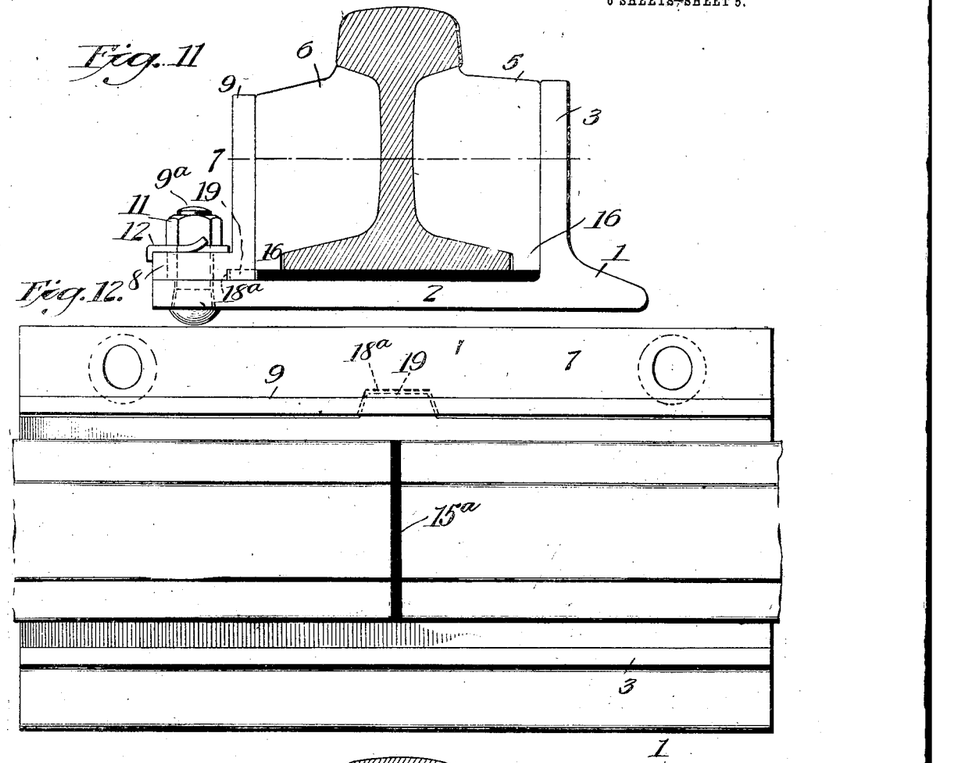
Figure 13:
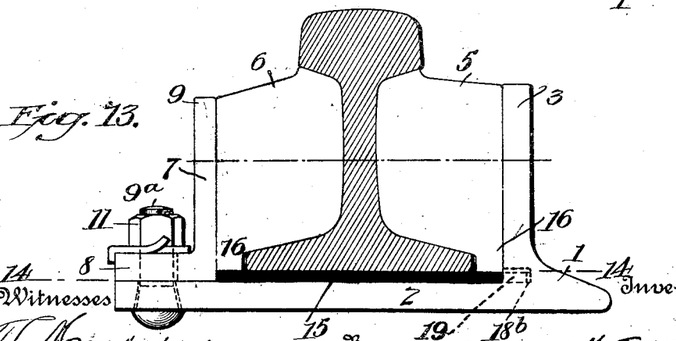
Fig. 13 is an end view of a rail joint illustrating a further modification in the arrangement of the locking means for the base insulating plate.
Figure 14:
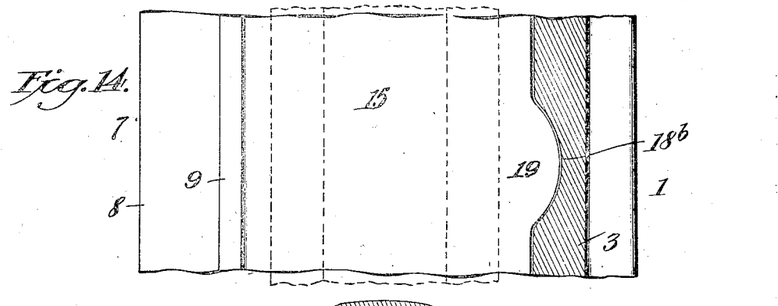
Fig. 14 is a horizontal sectional view on the line 14—14 of Fig. 13.
Figure 15:
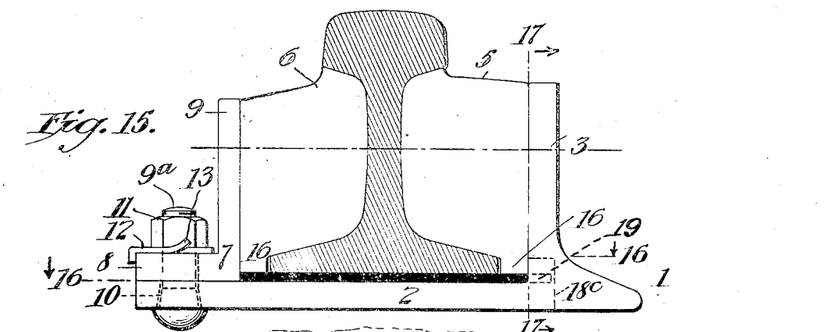
Fig. 15 is a view similar to Fig. 13, illustrating the vertically arranged characteristic of the curved or arcuate keeper mortise for the locking tenon of the insulating plate.
Figure 16:
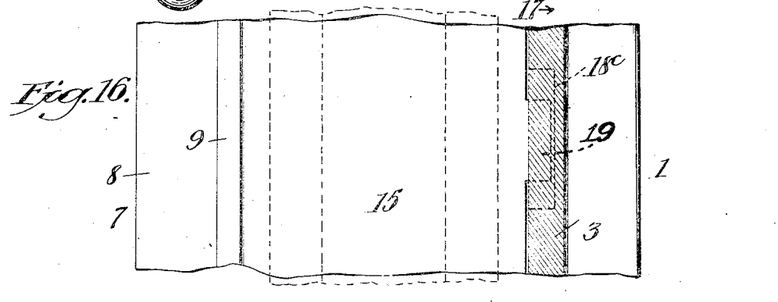
Fig. 16 is a horizontal sectional view on the line 16—16 of Fig. 15.
Figure 17:
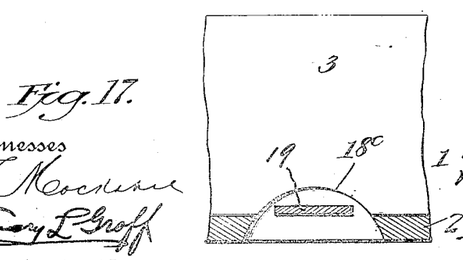
Fig. 17 is a vertical sectional view on the line 17—17 of Fig. 15.

In some forms of the invention, the holding shim may be entirely dispensed with and still preserve the features of the rigid clamping connection between the inner edge portion of the base plate and the girder bolting angle, the covering and inclosing of the base insulating plate from destructive foreign substances, and the locking of the base insulation against creeping or displacement. This phase of the invention is exemplified by the group of Figs. 11 to 17 inclusive. According to the form of the invention shown in Figs. 11 and 12 of the drawings, the girder bolting angle 7 may be bolted directly upon the inner edge portion of the base plate 2, and has formed in its lower inner edge the keeper mortise 18ᵃ to receive the locking tenon 19 provided at the edge of the base insulating plate 15. A variation of this form of construction may consist in forming the keeper recess 18ᵇ at the inside corner of the shoe angle in the upright member 3 thereof, and this form of construction is illustrated in Figs. 13, 14, 15, 16 and 17 of the drawings. It simply involves locating one or more keeper mortises at the junction of the upright and the base of the shoe angle instead of in the shim or girder bolting angle, as shown in Figs. 11 and 12, and other figures of the drawings. The keeper mortise 18ᵇ shown in Figs. 13 and 14, may be conveniently formed in a horizontal position by a milling cutter. This keeper mortise may again be varied as shown at 18ᶜ, in Figs. 15, 16 and 17 of the drawings wherein said mortise is disposed vertically instead of horizontally as shown in Figs. 13 and 14, the same being formed by milling cutter. Tenons 19, may be formed on the insulating base plate to appropriately interlock with the said keeper mortises.

Various other modifications and forms of construction may be resorted to without materially altering or affecting the salient features of the invention, as for instance, the insulating base plate may rest directly upon the base of the shoe angle and on top thereof may be a metal plate or plates protecting the insulating plate from the abrasive action of the rail, said plate or plates not extending longitudinally beyond the rail ends. This construction is substantially the same as, but is the reversal of the construction shown in the group of Figs. 8, 9 and 10.

Since these and other changes in the form and arrangement of parts will be obvious to those familiar with the art, further detail illustration thereof is deemed unnecessary. Accordingly, it is believed that the important and distinctive features of the present invention will now be thoroughly appreciated and understood without further description.

We claim:

1. A rail joint including, in combination with a shoe angle, opposite filler members, joint bolts, and a clamping member consisting of an angle plate held against one of the filler members by the joint bolts and rigidly bolted to the inner edge portion of the shoe angle base.

2. A rail joint including, in combination with a shoe angle, opposite filler members, and the joint bolts extending through the filler members and the upright member of the shoe angle, an inside clamping member consisting of an angle plate held to one of the filler members by the joint bolts and rigidly bolted to the inner edge portion of the shoe angle base.

3. A rail joint including, in combination with a shoe angle, oppositely arranged filler members and the joint bolts connecting the same, a clamping member consisting of an angle plate having an upright bolting flange held to one of the filler members by the joint bolts, and a lower horizontal foot flange overlying the inner edge portion of the shoe angle base, and a coupling bolt passed through said foot flange and shoe angle base.

4. A rail joint including, in combination with a shoe angle, oppositely arranged filler members and joint bolts connecting these parts, a clamping angle held against one of the filler members by the joint bolts and also overlying the inner edge portion of the shoe angle base, a coupling bolt arranged to clampingly connect said clamping angle with the shoe angle base, and a nut lock element engaged with the said clamping angle and also with the nut of the bolt.

5. A rail joint including, in combination with the rails, a shoe angle carrying a rigid member having a locking element, and a base insulating plate having an interlocking engagement with said locking element.

6. A rail joint including, in combination with the rails, a shoe angle carrying a rigid member having a mortise, and a base insulating plate having a tenon interlocking with said mortise.

7. A rail joint including, in combination with the rails, a shoe angle carrying a rigid member having a keeper mortise disposed inside of the joint, and an insulating plate having a locking tenon interlocking with said mortise.

8. A rail joint including, in combination with the rails, a shoe angle, opposite filler members and the joint fastenings, a clamping member engaged by the joint fastenings and bolted to the shoe angle base, a metal holding shim arranged as a solid metal blocking between said clamping member and the shoe angle base, and a base insulating plate interposed between the rail bases and the shoe angle base.

9. A rail joint including, in combination with the rails, a shoe angle, filler members and the joint fastenings, a clamping member engaged by the joint fastenings and bolted to the inner edge portion of the shoe angle base, a holding shim clamped between said clamping member and the shoe angle base, and a base insulating plate separably interlocked with said holding shim.

10. A rail joint including, in combination with the rails, a shoe angle, oppositely arranged filler members and the joint fastenings, a clamping member engaged by the joint fastenings and bolted to the inner edge portion of the shoe angle base, a metal holding shim interposed between the clamping member and the shoe angle base, said shim having a widened portion forming a rail-seating riser plate underlying the leaving rail of the joint, and a base insulating plate underlying the receiving rail of the joint.

11. A rail joint including, in combination with the rails, a shoe angle, oppositely arranged filler members and the joint fastenings, a clamping member engaged by the joint fastenings and bolted to the inner edge portion of the shoe angle base, a metal holding shim interposed between the clamping member and the shoe angle base, said shim having a widened portion forming a rail-seating riser plate underlying the leaving rail of the joint, and a base insulating plate underlying the receiving rail of the joint and interlocked with the shim.

12. A rail joint including, in combination with the rails, a shoe angle, oppositely arranged filler members and the joint fastenings, a clamping member engaged by the joint fastenings and bolted to the inner edge portion of the shoe angle base, a metal holding shim interposed between the clamping member and the shoe angle base, said shim having a widened portion forming a rail-seating riser plate underlying the leaving rail of the joint, and a base insulating plate underlying the receiving rail of the joint and separably interlocked with the shim.

13. A rail joint including, in combination with the rails, a shoe angle, opposite filler members, and the joint bolts, an angle clamping plate held to the inside filler member by the joint bolts, a bolted connection between the foot flange of said clamping member and the inner edge portion of the shoe angle base, a metal holding shim interposed between said foot flange and the shoe angle base and provided with a laterally widened portion forming a rail-seating riser plate of a length substantially equal to one-half of the length of the joint and underlying the leaving rail end therein, and an insulating plate underlying the receiving end within the joint and having an interlocked connection with the shim.

14. A rail joint including, in combination with the rails, a shoe angle, and a separate vertically adjustable girder member having a rigid clamping connection with the shoe angle base.

15. A rail joint including, in combination with the rails, a shoe angle, opposite fillers, and a separate vertically adjustable girder member arranged at the inside of the joint having a rigid clamping connection with the shoe angle base.

16. A rail joint including, in combination with the rails, a shoe angle, a rigid girder member, and means for rigidly clamping a member of varying thickness between said girder member and the shoe angle base.

17. A rail joint including, in combination with the rails, a girder bolting member, and means for clamping shims of various thicknesses between the base member and said girder member.

18. A rail joint including, in combination with the rails, a shoe angle carrying a rigid girder member and means beneath the latter for adjusting the height of said rigid girder member.

In testimony whereof, we hereunto affix our signatures in the presence of two witnesses.

REUBEN W. SMITH.
WILLIAM P. THOMSON.

Witnesses for Reuben W. Smith:
  HARVEY E. SMITH,
  I. D. DITTMAN.

Witnesses for Wm. P. Thomson:
  BENJ. WOLHAUPTER,
  E. F. SCHERMERHORN.